(12) United States Patent
Pooschen

(10) Patent No.: US 9,739,329 B2
(45) Date of Patent: Aug. 22, 2017

(54) PISTON-CYLINDER UNIT

(71) Applicant: STABILUS GMBH, Koblenz (DE)

(72) Inventor: Harald Pooschen, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 14/769,043

(22) PCT Filed: Feb. 18, 2014

(86) PCT No.: PCT/EP2014/053118
§ 371 (c)(1),
(2) Date: Aug. 19, 2015

(87) PCT Pub. No.: WO2014/128118
PCT Pub. Date: Aug. 28, 2014

(65) Prior Publication Data
US 2016/0003319 A1 Jan. 7, 2016

(30) Foreign Application Priority Data
Feb. 19, 2013 (DE) .................. 10 2013 101 627

(51) Int. Cl.
F16F 9/02 (2006.01)

(52) U.S. Cl.
CPC .................. F16F 9/0245 (2013.01)

(58) Field of Classification Search
CPC .......... F16F 9/0245; F16F 9/0263; F16F 9/34; F16F 9/3405
See application file for complete search history.

(56) References Cited

U.S. PATENT DOCUMENTS

| 3,828,651 | A | * | 8/1974 | Dorner | A47B 9/10 188/300 |
| 4,785,921 | A | * | 11/1988 | Hosan | F16F 9/52 188/276 |
| 5,823,513 | A | * | 10/1998 | Stenquist | F16F 9/0218 267/64.26 |
| 5,839,719 | A | * | 11/1998 | Hosan | B62D 25/12 188/300 |

(Continued)

FOREIGN PATENT DOCUMENTS

| CN | 1195746 | 10/1998 |
| CN | 103133586 | 6/2013 |

(Continued)

OTHER PUBLICATIONS

Office Action dated Oct. 13, 2016 which issued in the corresponding Korean Patent Application No. 10-2015-7025020.

(Continued)

Primary Examiner — Vishal Sahni
(74) Attorney, Agent, or Firm — Cozen O'Connor

(57) ABSTRACT

A lockable piston-cylinder unit having a cylinder that is closed at both ends and filled with pressurized fluid and in which a piston that is sealed relative to the inner wall of the cylinder is displaceably guided. The piston divides the interior of the cylinder into a first working chamber and a second working chamber. A piston rod is arranged at the piston and is guided out of the cylinder 1 through one of the working chambers and through a guiding and sealing unit which closes the one end of the cylinder.

18 Claims, 6 Drawing Sheets

(56) References Cited

U.S. PATENT DOCUMENTS

| | | | | |
|---|---|---|---|---|
| 6,056,251 A * | 5/2000 | Knopp | ...................... | A47C 3/30 |
| | | | | 108/144.11 |
| 6,705,201 B2 | 3/2004 | Knopp et al. | | |
| 2004/0061266 A1* | 4/2004 | Riel | ...................... | F16F 9/0272 |
| | | | | 267/124 |
| 2005/0103586 A1* | 5/2005 | Knaust | ................... | F16F 9/461 |
| | | | | 188/275 |
| 2006/0175743 A1* | 8/2006 | Chung | ..................... | A47C 3/30 |
| | | | | 267/64.12 |
| 2011/0139957 A1* | 6/2011 | Friesen | ................... | A47B 9/10 |
| | | | | 248/634 |

FOREIGN PATENT DOCUMENTS

| | | |
|---|---|---|
| DE | 24 59 340 | 7/1976 |
| DE | 38 36 398 | 5/1990 |
| DE | 40 09 100 | 9/1991 |
| DE | 195 15 368 | 11/1996 |
| DE | 20 2005 011 987 | 11/2005 |

OTHER PUBLICATIONS

English translation of an Office Action dated Dec. 28, 2016 which issued in the corresponding Chinese Patent Application No. 2014800088044.

Office Action dated Feb. 3, 2017 which issued in the corresponding Korean Patent Application No. 10-2015-7025020.

* cited by examiner

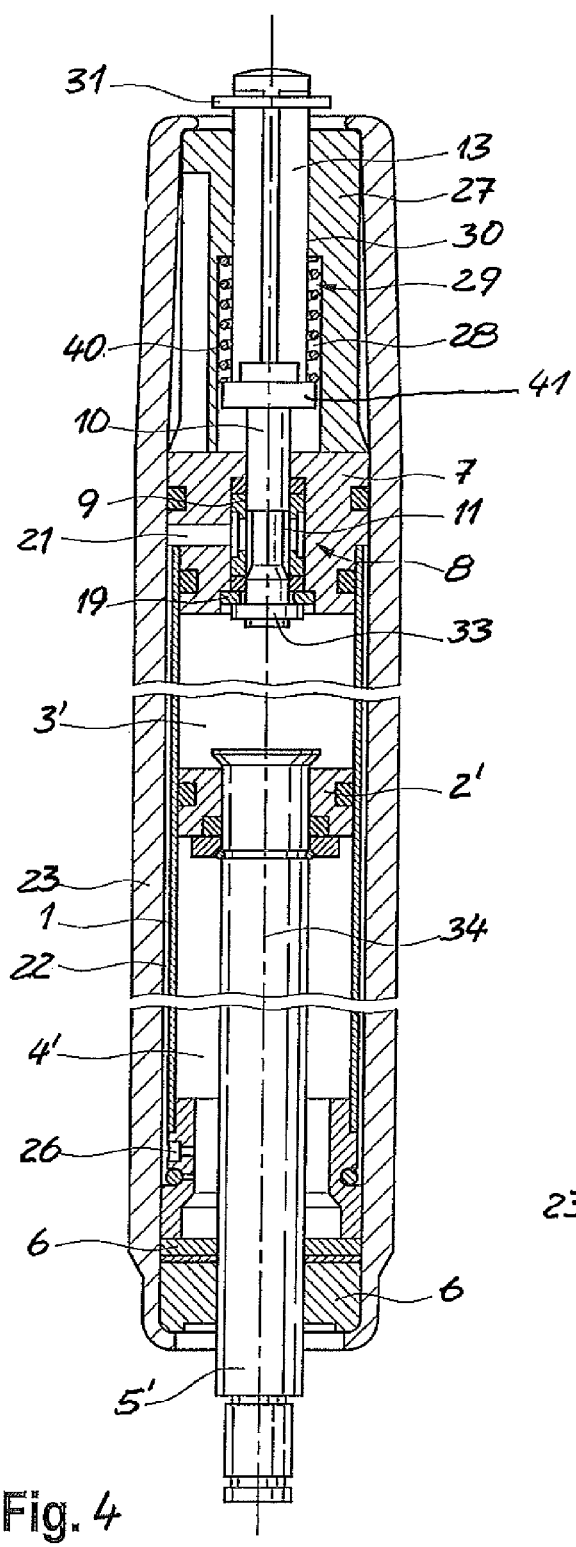
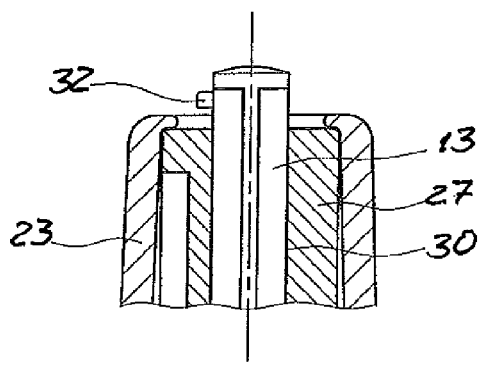
Fig. 4
Fig. 5

PISTON-CYLINDER UNIT

CROSS REFERENCE TO RELATED APPLICATIONS

This is a U.S. national stage of application No. PCT/EP2014/053118, filed on Feb. 18, 2014. Priority is claimed on German Application No. DE 102013101627.8, filed Feb. 19, 2013, the content of which is incorporated herein by reference.

BACKGROUND OF THE INVENTION

1. Field of the Invention

The invention is directed to a lockable piston-cylinder unit having a cylinder closed at both ends and filled with pressurized fluid in which a piston that is sealed relative to the inner wall of the cylinder is displaceably guided. The piston divides the interior of the cylinder into a first working chamber and a second working chamber and has a piston rod arranged at the piston and is guided out of the cylinder through one of the working chambers and through a guiding and sealing unit which closes the one end of the cylinder. An actuation rod is arranged to be axially displaceable, one end of the actuation rod projects out of the cylinder and can be acted upon by an actuation element so as to be movable in the push-in direction of the actuation rod, and a valve slide of a blocking valve which can be acted upon in closing direction by the pressure in the first working chamber can be acted upon by the other end of the actuation rod in opening direction of the blocking valve so as to be axially displaceable by a displacement between a closed neutral position and its open position, through which blocking valve the first working chamber can be connected to the second working chamber via a connection, wherein the actuation element is movable between an actuation position and a non-actuation position, and the actuation element contacts a stop in the non-actuation position.

2. Detailed Description of the Prior Art

In lockable piston-cylinder units of the type mentioned above, due to manufacturing tolerances, there is play between the actuation element and the actuation rod in the non-actuation position of the actuation element. Depending on the application, this play leads to rattling noises when these parts strike one another. To prevent a rattling noise of this kind, it is known to apply spring force to the actuation element in direction of the actuation rod so as to keep it permanently in contact with the actuation rod.

This arrangement is uneconomical and requires additional component parts and additional assembly effort.

SUMMARY OF THE INVENTION

It is an object of the invention to provide a piston-cylinder unit of the type mentioned above that prevents rattling noise caused by the actuation element and actuation rod striking one another in a simple, easy-to-assemble construction.

According to one embodiment of the invention a valve slide in its closed neutral position without contacting a fixed stop is forced in closing direction by the pressure in the first working chamber and is permanently supported at the actuation element via the actuation rod.

As a result of this construction, no additional spring elements are required for holding the actuation element and actuation rod in contact with one another; rather, the pressure in the cylinder, which acts upon the closing member and which exists anyway, is utilized for this purpose. This also allows the piston-cylinder unit to have a small size.

A simple construction has the valve slide displaceably arranged in a through-opening extending coaxial to the cylinder in a valve body and a region of reduced diameter between a first region of greater diameter and a second region of greater diameter into which a connection opening formed in the valve body opens radially, this connection opening connecting the region of reduced diameter to the second working chamber. The first region of the valve slide that is at a greater distance from the first working chamber is displaceably guided in the through-opening to be sealed by a first seal, and the second region of greater diameter of the valve slide that is closer to the first working chamber is displaceably guided in the through-opening so as to be sealed by a second seal and projects partially into the first working chamber in its closed neutral position and projects at least approximately completely into the first working chamber in its open position.

The displacement of the valve slide between its closed neutral position and its open position is located within an axial preloading distance. During assembly, the actuation rod is brought into contact with the valve slide and, when the actuation element is installed, the actuation rod and, along with it, the valve slide are then displaced by the actuation element within the preloading distance in the opening direction against the pressure in the cylinder, without arriving in the open position. In this position, the actuation element is in its non-actuation position and contacts its fixed stop defining the non-actuation position. At the same time, the valve slide is still acted upon by the pressure in the cylinder and is supported at the stop via the actuation rod and actuation element.

In a simple construction, the first seal and/or the second seal can be a sealing ring arranged in the valve body and which tightly surrounds the valve slide.

In one embodiment the piston forms the valve body and the actuation rod is displaceably guided through a coaxial passage of the piston rod. In so doing, an actuation device having the actuation element can be arranged at the end of the piston rod that projects freely outward. In one embodiment, the valve body is fixedly arranged at the end of the cylinder remote of the piston rod so as to close the latter. In so doing, a guide element with a coaxial passage can be arranged at the valve body on the side remote of the piston, and the piston rod can be displaceably guided through this coaxial passage.

In a simple construction, the actuation element is a swiveling lever that is swivelable around a pivot extending transverse to the longitudinal extension of the actuation rod, the actuation rod contacting this swiveling lever at a distance from the pivot. In so doing, the actuation rod can contact the swiveling lever by its front end opposite the valve slide.

The valve slide can be acted upon in opening direction indirectly or directly by a preloaded spring element supported at the cylinder or at a component part which is fixedly connected to the cylinder, the preloading force of this spring element being smaller than the closing force acting on the valve slide through the pressure in the first working chamber.

As a result of this construction, only slightly more than the differential force between the closing force acting on the valve slide and the force of the spring element acting in the opposite direction on the valve slide need be applied for canceling the locking of the piston. This differential force can be very small. It need only ensure that when valve actuation force is not applied the valve slide moves securely into its closed position and is held there to cancel the locking of the valve slide. This also facilitates an actuation of the release tappet.

The valve slide can be acted upon so as to be movable from its closed position into its open position by an actuation rod which is guided axially out of the cylinder. In so doing, the valve slide can be drivable by an actuator, but also indirectly or directly manually, so as to be movable out of its closed position into its open position.

Only a small installation space is required when the spring element is a helical compression spring that surrounds the valve slide or the actuation rod at a distance and which is supported by its one end at a structural component part which is fixedly connected to the cylinder and acts on the valve slide or the actuation rod with its other end.

Accordingly, the entire piston-cylinder unit can also be constructed with a small size.

Further, a helical compression spring is a simple and inexpensive component.

To allow actuation manually or by an actuator transverse to the longitudinal axis of the cylinder, the front side of the end of the valve slide or of the actuation rod, which end projects out of the cylinder, can be acted upon by the first arm of a two-armed swiveling lever which is swivelable around a pivot which extends transverse to the longitudinal axis of the cylinder and which is fixedly connected to the cylinder, which swiveling lever is acted upon by the spring element so as to operate the first arm against the front side of the valve slide or of the actuation rod, and its second arm can be acted upon by the valve actuation force.

In this regard, the spring element can be a tension spring supported at the cylinder or at a structural component part connected to the cylinder and, in a simple construction, is a garter spring surrounding the second arm of the lever arm and the component part connected to the cylinder.

The valve can be either a poppet valve or a gate valve.

One construction consists in that the valve is arranged in a valve body closing the cylinder in an end area.

A piston-cylinder unit of this type is advantageously applicable in an object support column such as a chair column or table column for vertical adjustment of the seat surface or table surface.

In another construction, the valve can be arranged in the piston.

A construction of this type can advantageously be used preferably for locking heavy hatches and covers, but also for other applications which require holding in different positions.

BRIEF DESCRIPTION OF THE DRAWINGS

Embodiment examples of the invention are shown in the drawings and are described in more detail in the following. In the drawings:

FIG. 4 is a lockable piston-cylinder unit in longitudinal section;

FIG. 5 is an end area of a lockable piston-cylinder unit in longitudinal section;

DETAILED DESCRIPTION OF THE PRESENTLY PREFERRED EMBODIMENTS

Figure 1:
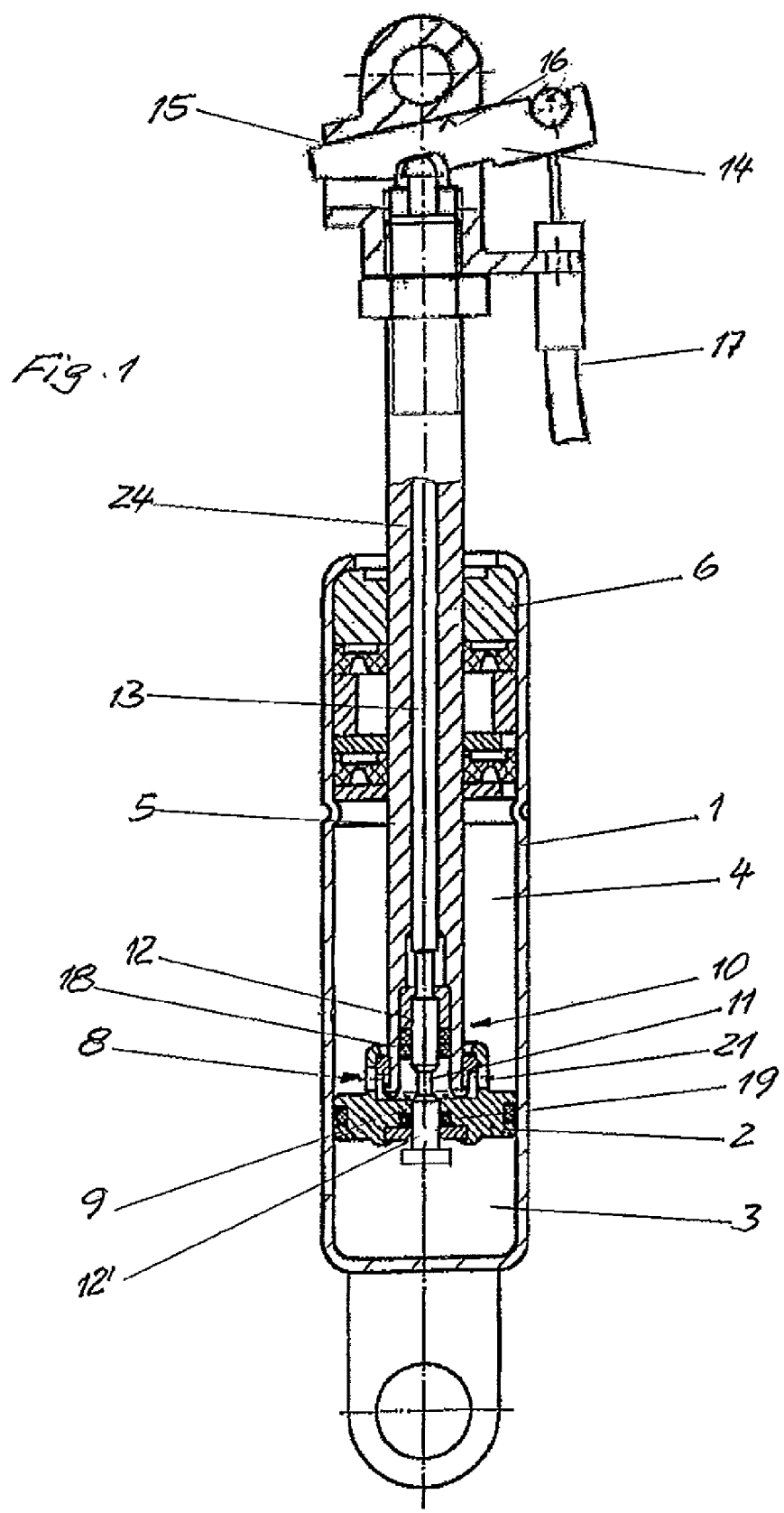
FIG. 1 is a lockable piston-cylinder unit in longitudinal section.
Figure 2:
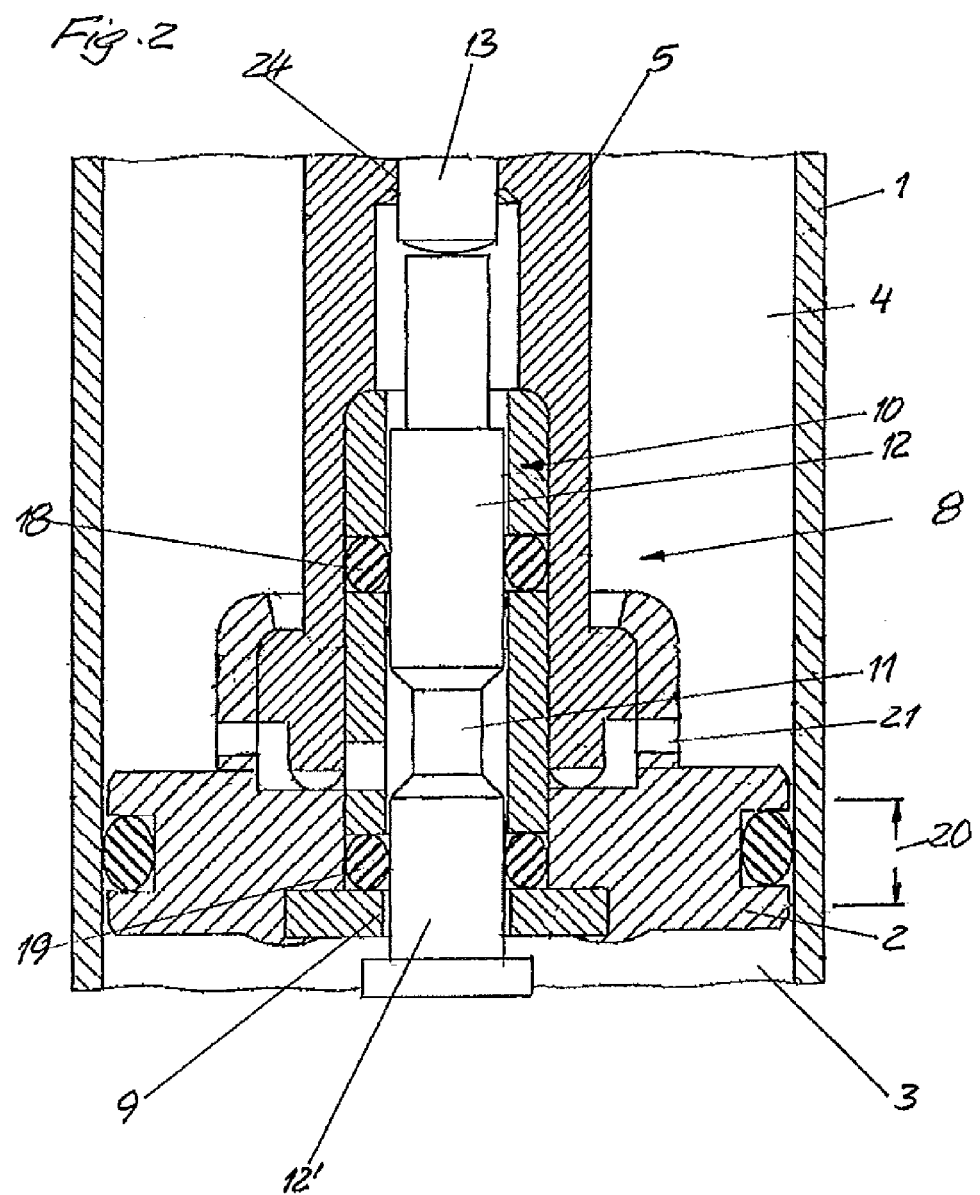
FIG. 2 is an enlarged view of a detail of the piston-cylinder unit according to FIG. 1 in longitudinal section.
Figure 3:
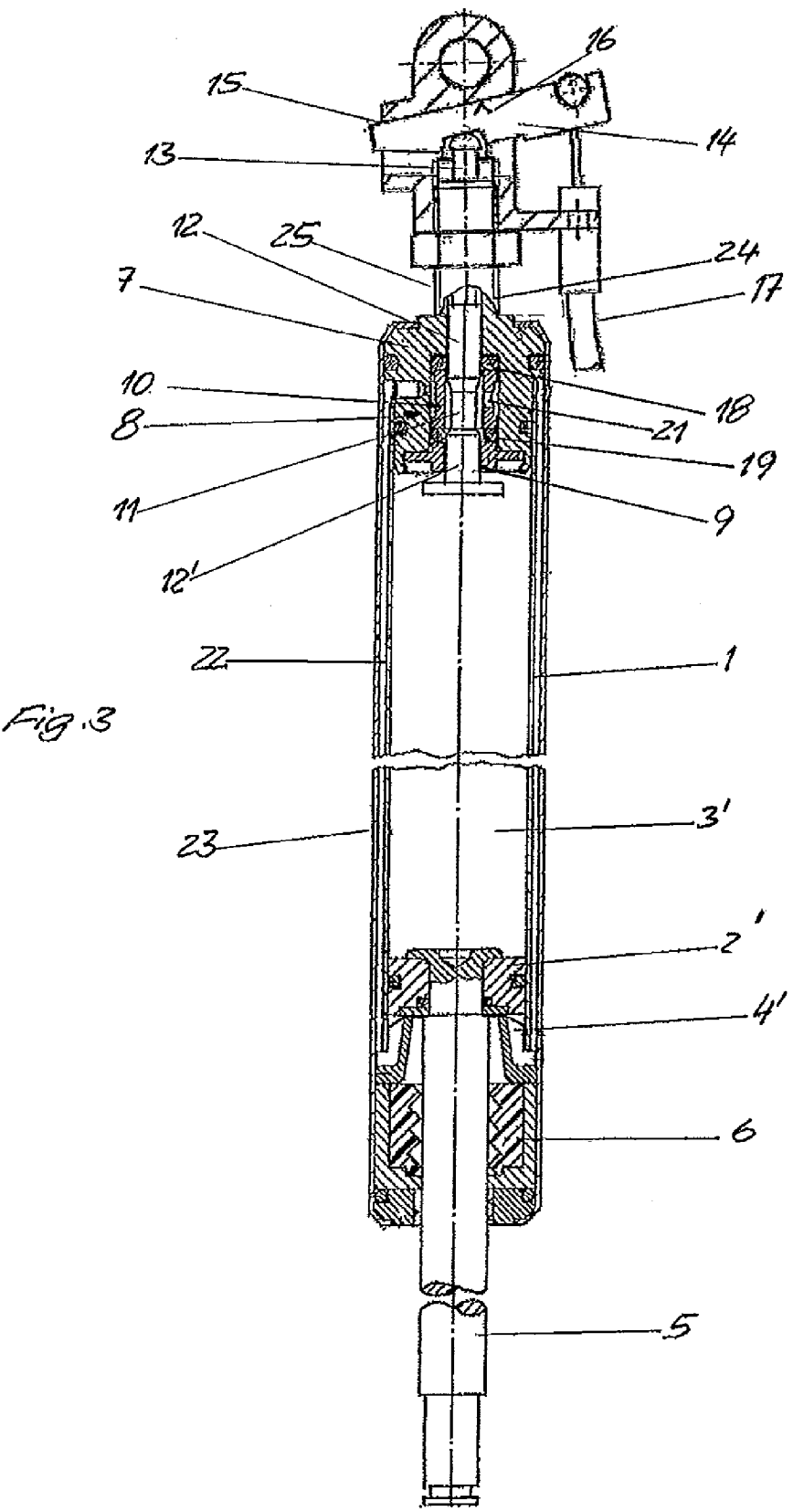
FIG. 3 is a lockable piston-cylinder unit in longitudinal section.

The lockable piston-cylinder units shown in FIGS. 1 to 3 have a cylinder 1 in which a piston 2, 2' is guided so as to be axially displaceable, the interior of the cylinder 1 which is filled with a pressurized gas being divided by piston 2, 2' into a first working chamber 3, 3' and a second working chamber 4, 4'.

A piston rod 5, 5' is fixedly arranged at the piston 2, 2' at one side. The piston rod 5, 5' is guided through second working chamber 4 in FIG. 1 and through second working chamber 4' in FIG. 3 and is guided outward so as to be sealed through a guiding and sealing unit 6.

A blocking valve 8 is arranged in piston 2 in FIGS. 1 and 2 and in a valve body 7 closing the cylinder 1 at its end remote of the piston rod in FIG. 3. The blocking valve 8 has a cylindrical valve slide 10 displaceably arranged in a through-opening 9 formed coaxially in the piston 2 or in the valve body 8.

The valve slide 10 has in its center region 11 a reduced diameter, while the two outer regions 12, 12' have a larger diameter corresponding to the through-opening 9.

The outer region 12 is surrounded by a first sealing ring 18 that seals the through-opening 9 from the region 11 of smaller diameter of the valve slide 10 to an actuation rod 13. This seal is maintained in every axial position of the valve slide 10.

Outer region 12' is surrounded by a second sealing ring 19 that seals the through-opening 9 from the region 11 of smaller diameter of the valve slide 10 to the first working chamber 3, 3' in the closed neutral position shown in the drawing.

At its end facing the first working chamber 3, 3', the valve slide 10 is permanently acted upon by the pressure in the first working chamber 3, 3'.

An actuation rod 13 that is guided so as to be displaceable coaxial to the valve slide 10 contacts and is supported at the front end of the valve slide 10 remote of the first working chamber 3, 3' by its one end and contacts and is supported at a swiveling lever 14 swivelable around a pivot 15 at a distance from the pivot 15 by its other end.

In the embodiment example in FIGS. 1 and 2, the actuation rod 13 is displaceably guided through a coaxial passage 24 in the piston rod 5, and in the embodiment example in FIG. 3 through a coaxial passage 24 in a guide element 25 arranged at the valve body 7.

In the non-actuation position shown in the drawing, the swiveling lever 14 contacts a stop 16.

Engaging at the end region of the swiveling lever 14 opposite the pivot 15 is the core of a Bowden cable 17 which can be put into tension manually or by motor and can accordingly swivel the swiveling lever 14 so as to lift off from the stop 16. Accordingly, the valve slide 10 is also displaced by a displacement 20. At the end of the displacement 20, the region 11 of smaller diameter of the valve slide 10 is in the open position, a position overlapping the second sealing ring 19, so that the first working chamber 3, 3' can flow around the second sealing ring 19 through the region 11 of smaller diameter. This is the open position of the valve slide 10.

The region 11 of smaller diameter is then also configured to overlap with a connection opening 21 which is formed radially in the piston 2 or valve body 7 and which leads into the through-opening 9.

In FIGS. 1 and 2, the connection opening 21 leads directly to the second working chamber 4.

In FIG. 3, the connection opening 21 leads to an outwardly closed annular gap 22 between cylinder 1 and an outer cylinder 23 enclosing the cylinder at a distance. The annular gap 22 is connected to the second working chamber 4' at its end opposite the valve body 7.

As a result of this swiveling movement of the swiveling lever 14, the actuation rod 13 is displaced toward the blocking valve 8 and also displaces the valve slide 10 farther into the first working chamber 3, 3'.

Accordingly, in both embodiment examples, the first working chamber 3, 3' is connected to the second working chamber 4, 4' as a result of the valve slide 10 achieving the open position.

During assembly of the piston-cylinder unit, the actuation rod 13 is inserted into the passage 24 after installing the blocking valve 8 and filling the cylinder 1 with pressurized gas.

The arrangement of the swiveling lever 14 is then carried out. Because of the length of the actuation rod 13, this actuation rod 13 must be displaced to a certain extent in opening direction so that the swiveling lever 14 can reach its installed position abutting the stop 16. In so doing, the valve slide 10 is also displaced in the opening direction by the same amount against the pressure in the first working chamber 3, 3', but only far enough that the region 12' of larger diameter is still enclosed by the second sealing ring 19 and the through-opening 9 accordingly remains closed. The valve slide 10 is now located in its closed neutral position. Since the valve slide 10 continues to be acted upon by the pressure in the first working chamber 3, 3', it is forced by this pressure against the actuation rod 13, and the actuation rod 13 in turn presses the swiveling lever 14 firmly in contact with the stop 16 so that regardless of manufacturing tolerances there is no play between the valve slide 10 and stop 16 which could cause rattling noise.

However, in contrast to the prior art, no additional component parts are required for this purpose; rather, only the pressure which is present anyway in the cylinder 1 is utilized.

The lockable piston-cylinder units shown in FIGS. 4 to 7 have an outer cylinder 23 in which a cylinder 1 is coaxially arranged. Because of the different diameters, an annular gap 22 forming a flow path is formed between the annular cylinder 23 and cylinder 1.

A piston 2' is arranged in the cylinder 1 so as to be axially displaceable and divides the cylinder 1 into a first working chamber 3' and a second working chamber 4'.

A piston rod 5' which is connected by its one end to the piston 2' is guided through the second working chamber 4' and outward through guiding and sealing units 6 so as to be sealed.

In the end region of cylinder 1 near the guiding and sealing unit 6, the second working chamber 4' is connected to the annular gap 22 via a radial opening 26.

A valve body 7 is inserted into the end of the cylinder 1 opposite the guiding and sealing unit 6, and the end of the valve body 7 projecting out of the cylinder 1 sealingly contacts the inner wall of the outer cylinder 23.

A spacer 27 is located between the valve body 7 and the upper end of the outer cylinder 23 and is enclosed at its end opposite the valve body 7 by a bead of the end of the outer cylinder.

A stepped coaxial guide bore 29 is formed in the spacer 27, the large step 28 thereof facing the valve body 7. An actuation rod 13 is displaceably guided in the small step 30 of the guide bore 29, one end of which actuation rod 13 projects outward from the guide bore 29 and can be acted upon by an axially inwardly directed valve actuation force.

A retaining washer 31 is arranged at the actuation rod 13 (FIG. 4). This retaining washer 31 facilitates correct and reliable assembly.

Alternatively, the actuation rod 13 has a radially protruding tab 32 with the same function (FIG. 5).

At its end directed toward the valve body 7, the actuation rod 13 abuts a valve slide 10 of a blocking valve 8, this valve slide 10 forming a closing member.

The valve slide 10 is displaceably arranged in an axially continuous through-opening 9 of the valve body 7 opening into the first working chamber 3' and has at its end facing the first working chamber 3' a flange-like widening 33 which can make contact in the moving-out direction at a second sealing ring 19 forming a valve seat arranged at the valve body 7.

Inside the valve body 7, the valve slide 10 has a region of smaller diameter 11. The through-opening 9 in the region overlapped by the region 11 of smaller diameter is connected to the annular gap 22 by a radial connection opening 21 in the valve body 7.

Figure 6:
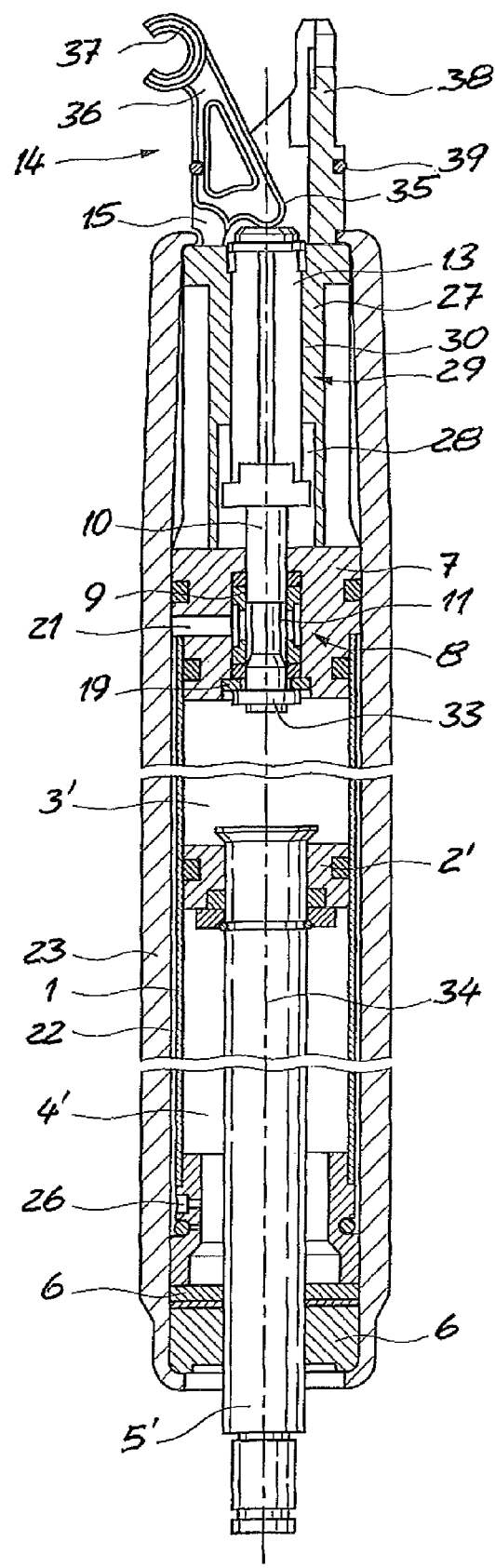
FIG. 6 is a lockable piston-cylinder unit in longitudinal section.

As shown in FIG. 6, at the region of the spacer 27 projecting out of the outer cylinder 23 a two-armed swiveling lever 14 is mounted so as to be swivelable around a pivot 15 extending transverse to the longitudinal axis 34 of the cylinder 1.

The first arm 35 of the two-armed swiveling lever 14 contacts the outer front side of the actuation rod 13, while the second arm 36 extends approximately parallel to the longitudinal axis 34 and has at its free end a connection piece 37 to which a valve actuation force can be applied transverse to the longitudinal axis 34.

Using a preloaded garter spring 39, which encircles the second arm 36 and a part 38 of the spacer 27 extending parallel to the longitudinal axis 34, the first arm 35 contacts the actuation rod 13 under corresponding preloading and acts upon the valve slide 10 via the actuation rod 13 in lift-off direction of the flange-like widening 33 from the second sealing ring 19.

As shown in FIGS. 4 and 5, the actuation rod 13 is surrounded in the region of the large step 28 of the guide bore 29 by a preloaded helical compression spring 40 which is supported by its one end at the shoulder between the large step 28 and the small step 30 of the guide bore 29 and by its other end at the flange-like widening 41 of the actuation rod 13 and acts upon the valve slide 10 via the actuation rod 13 in lift-off direction of the flange-like widening 33 from the second sealing ring 19 without opening the valve.

The two working chambers 3' and 4' are filled with a pressurized gas. Gas pressure of the first working chamber 3' also acts on the flange-like widening 33 of the valve slide 10 and presses it against the second sealing ring 19. In this way, a flow passage from the first working chamber 3' through the through-opening 9, radial bore 21, annular gap 22 and radial opening 26 to the second working chamber 4 is held closed.

The force of the garter spring 39 (FIG. 6) or helical compression spring 40 (FIG. 7) acting on the actuation rod 13 in valve closing direction is smaller than the force exerted on the valve slide 10 in valve closing direction by the gas pressure in the first working chamber 3'.

The flange-like widening 13 is accordingly held in contact at the second sealing ring 19, and the valve passage 9 is therefore held closed.

The valve slide 10 is not displaced and the valve passage is not opened until the actuation rod 13 is acted upon in valve opening direction by an additional valve actuation force which, added to the force acting on the actuation rod 13 by the garter spring 39 or helical compression spring 40, is greater than the force acting upon the valve slide 10 in closing direction.

The piston 2 and, along with it, the piston rod 5 can accordingly be displaced in the cylinder 1.

When the valve actuation force ceases to be applied, the valve passage is closed again and the piston 2 is locked in the position occupied by it.

Figure 7:
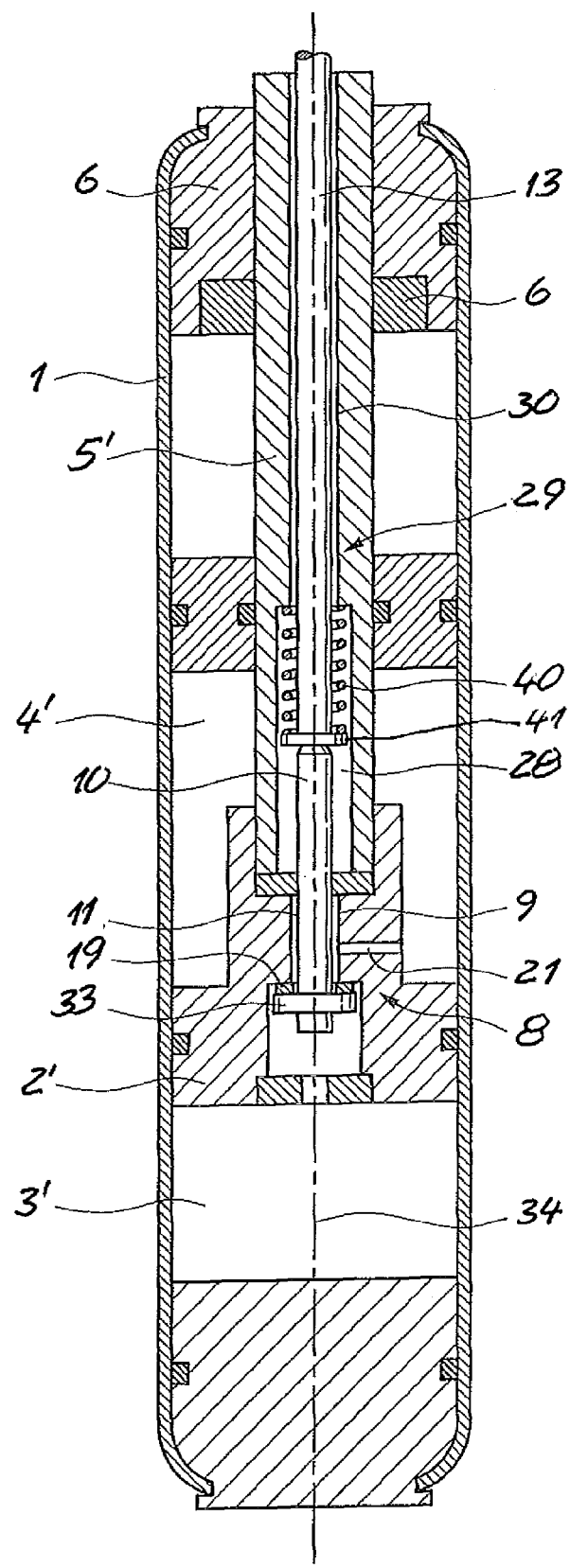
FIG. 7 is a lockable piston-cylinder unit in longitudinal section.

The example in FIG. 7 has substantially the same construction as the embodiment examples in FIGS. 4 to 6 and is correspondingly provided with the same reference numerals.

In contrast to FIGS. 4 to 6, the blocking valve 8 is not arranged in a valve body, but rather in the piston 2.

When the valve passage is open, the first working chamber 3' is connected to the second working chamber 4' via through-opening 9 and radial connection opening 21.

The actuation rod 13 is guided through the guide bore 29 in the piston rod 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A lockable piston-cylinder unit comprising:
a cylinder that is closed at both ends and filled with a pressurized fluid;
a guiding and sealing unit that closes one end of the cylinder;
a piston, which divides the interior of the cylinder into a first working chamber and a second working chamber, is displaceably guided in the cylinder and sealed relative to an inner wall of the cylinder;
a piston rod arranged at the piston and guided out of the cylinder through one of the working chambers and through the guiding and sealing unit;
a stop;
an actuation element movable between an actuation position and a non-actuation position, the actuation element configured to contact the stop in the non-actuation position;
an actuation rod arranged to be axially displaceable, a first end of the actuation rod projects out of the cylinder and is configured to be acted upon by the actuation element to be movable in a push-in direction of the actuation rod; and
a blocking valve that provides a connection between the first working chamber and the second working chamber and having a valve slide that can be acted upon in a closing direction by a pressure in the first working chamber and acted upon by a second end of the actuation rod in an opening direction of the blocking valve to be axially displaceable by a displacement between a closed neutral position and its open position,
wherein the valve slide in its closed neutral position without contacting a fixed stop is forced in closing direction by the pressure in the first working chamber and is permanently supported at the actuation element via the actuation rod and in constant contact with the stop and an end portion of the slide opposite the stop is spaced apart from the piston,
wherein the valve slide is arranged beyond the piston.

2. The piston-cylinder unit according to claim 1, further comprising
a valve body having a through-opening that extends coaxially with respect to the cylinder in which the valve slide is displaceably arranged and a connection opening,
wherein the valve slide has a region of reduced diameter between a first region of greater diameter and a second region of greater diameter into which the connection opening opens radially,
wherein the connection opening is configured to connect the region of reduced diameter to the second working chamber,
wherein the first region of greater diameter of the valve slide, which is at a greater distance from the first working chamber, is displaceably guided in the through-opening and sealed by a first seal, and
wherein the second region of greater diameter of the valve slide, which is closer to the first working chamber, is displaceably guided in the through-opening and sealed by a second seal, and
wherein the second region of greater diameter partially projects into the first working chamber in its closed neutral position and projects substantially completely into the first working chamber in its open position.

3. The piston-cylinder unit according to claim 2, wherein at least one of the first seal and the second seal is a sealing ring arranged in the valve body that tightly surrounds the valve slide.

4. The piston-cylinder unit according to claim 2, wherein the piston forms the valve body, and the actuation rod is displaceably guided through a coaxial passage of the piston rod.

5. The piston-cylinder unit according to claim 4, wherein an actuating device comprising the actuation element is arranged at an outward projecting end of the piston rod.

6. The piston-cylinder unit according to claim 2, wherein the valve body is fixedly arranged at an end of the cylinder remote of the piston rod.

7. The piston-cylinder unit according to claim 6, wherein a guide element having a coaxial passage is arranged at a side of the valve body remote of the piston, wherein the piston rod is displaceably guided through the coaxial passage.

8. The piston-cylinder unit according to claim 7, wherein an actuation device comprising the actuation element is arranged at an outward projecting end of the guide element.

9. The piston-cylinder unit according to claim 1, wherein the actuation element is a swiveling lever that is swivelable around a pivot extending transverse to a longitudinal extension of the actuation rod, the actuation rod contacting the swiveling lever at a distance from the pivot.

10. The piston-cylinder unit according to claim 9, wherein the actuation rod contacts the swiveling lever by its front end opposite to the valve slide.

11. The piston-cylinder unit according to claim 1, further comprising
   a preloaded spring element that is supported by one end at one of the cylinder and a component part that is fixedly connected to the cylinder and configured to act with its other end on the valve slide in an opening direction one of indirectly and directly,
   wherein a preloading force of this spring element is smaller than a closing force acting on the valve slide by a pressure in the first working chamber.

12. The piston-cylinder unit according to claim 11, wherein the valve slide is configured to be movable from its closed position into its open position by the actuation rod which is guided axially out of the cylinder.

13. The piston-cylinder unit according to claim 11, wherein the spring element is a helical compression spring that surrounds one of the valve slide and the actuation rod at a distance and which is supported by the one end at the component part which is fixedly connected to the cylinder and acts on the one of the valve slide and the actuation rod with the other end.

14. The piston-cylinder unit according to claim 11, wherein one of a front side of the end of the valve slide and the actuation rod, which end projects out of the cylinder, can be acted upon by a first arm of a two-armed swiveling lever that is swivelable around a pivot that extends transverse to a longitudinal axis of the cylinder and which is fixedly connected to the cylinder, the two-armed swiveling lever is acted upon by the spring element to operate the first arm against the front side of the valve slide or of the actuation rod, and a second arm of the two-armed swiveling lever can be acted upon by a valve actuation force.

15. The piston-cylinder unit according to claim 11, wherein the blocking valve is a blocking valve configured as a poppet valve.

16. The piston-cylinder unit according to claim 11, wherein the blocking valve is a gate valve.

17. The piston-cylinder unit according to claim 11, wherein the blocking valve is arranged in a valve body closing the cylinder in an end area.

18. The piston-cylinder unit according to claim 11, wherein the blocking valve is arranged in the piston.

* * * * *